Figure 1:
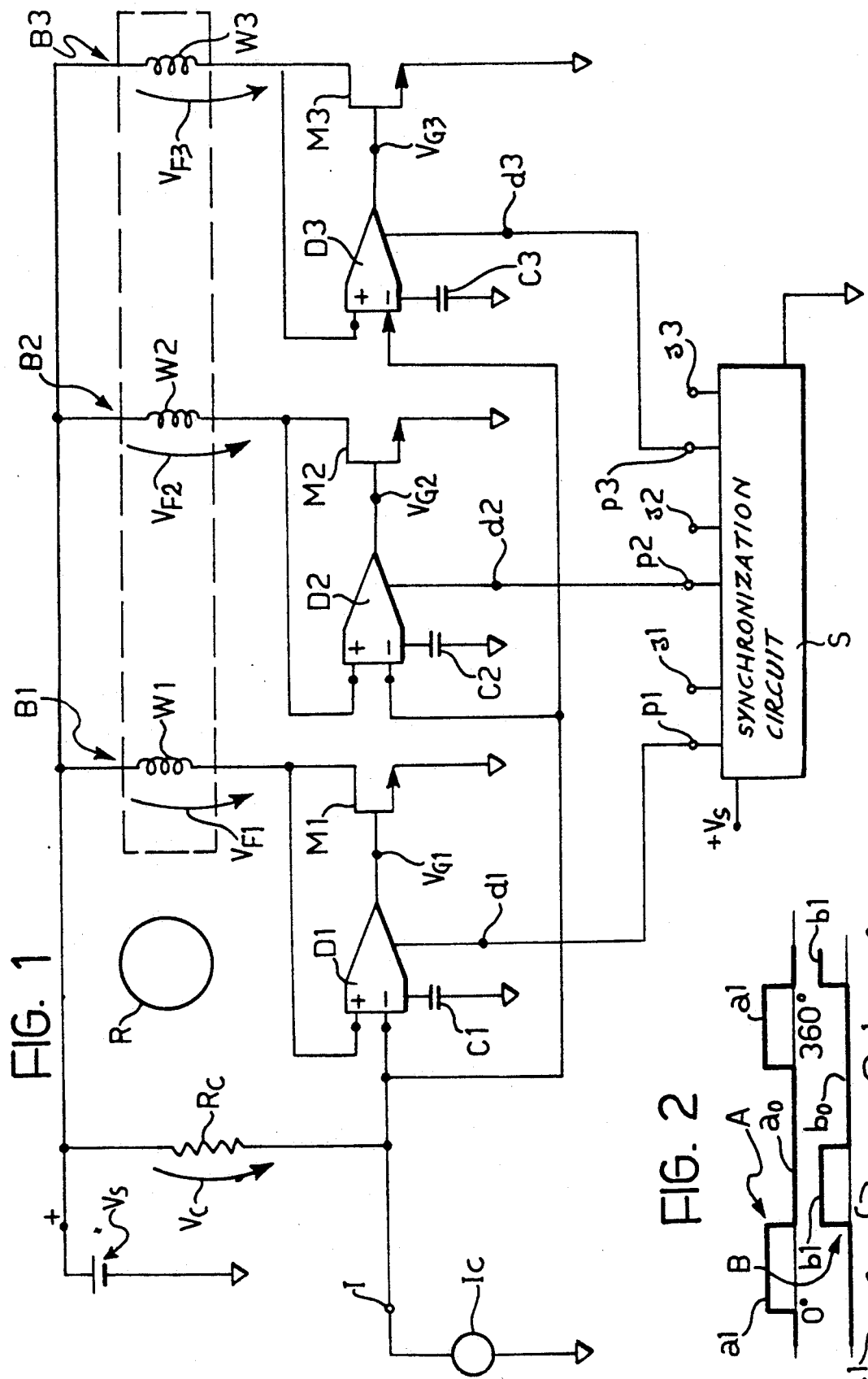

United States Patent [19]
Salerno et al.

[11] Patent Number: 5,241,247
[45] Date of Patent: Aug. 31, 1993

[54] LINEAR FEEDBACK CONTROL CIRCUIT FOR A HALF-WAVE POLYPHASE BRUSHLESS MOTOR

[75] Inventors: Franco Salerno, Alpignano; Pietro De Filippis, Milan, both of Italy

[73] Assignee: Industrie Magneti Marelli, Milan, Italy

[21] Appl. No.: 955,359

[22] Filed: Oct. 1, 1992

[30] Foreign Application Priority Data

Oct. 15, 1991 [IT] Italy .............. 000782 A/91

[51] Int. Cl.⁵ ............................................ H02P 6/02
[52] U.S. Cl. ................................. 318/254; 318/138
[58] Field of Search .................. 318/138, 254, 439

[56] References Cited

U.S. PATENT DOCUMENTS

| | | | |
|---|---|---|---|
| 3,584,280 | 6/1971 | Inagaki | 318/254 |
| 3,611,081 | 10/1971 | Watson | 318/138 |
| 3,706,019 | 12/1972 | Eremenko | 318/254 |
| 3,766,458 | 10/1973 | Nishimura et al. | |
| 4,132,930 | 1/1979 | Schalk | 318/138 |
| 4,262,236 | 4/1981 | Gelenius et al. | 318/138 |
| 4,588,933 | 5/1986 | Sun | 318/254 |
| 4,678,973 | 7/1987 | Elliott et al. | 318/254 |

OTHER PUBLICATIONS

Electronic Engineering, vol. 58, No. 719, Nov. 1986, p. 52.
EDN Electrical Design News, vol. 32, No. 18, Sep. 1987, pp. 227–234.

*Primary Examiner*—Bentsu Ro
*Attorney, Agent, or Firm*—Fish & Richardson

[57] ABSTRACT

The circuit comprises synchronisation devices operable to provide, for a motor having n phases, n square wave control signals phase displaced from one another by 360/n electrical degrees, with a frequency proportional to the speed of the rotor of the motor, and linear feedback pilot circuit devices operable to provide at their output, cyclically to each of the power transistors, which pilot the phases, a respective pilot signal variable as a function of a reference signal and the voltage on the corresponding phases of the motor.

1 Claim, 4 Drawing Sheets

LINEAR FEEDBACK CONTROL CIRCUIT FOR A HALF-WAVE POLYPHASE BRUSHLESS MOTOR

DESCRIPTION

The present invention relates to a control circuit for a polyphase half-wave brushless motor. More specifically, the subject of the invention is a linear feedback control circuit comprising an input terminal for receiving a variable reference signal indicative of the desired speed of rotation of the motor, a set of n (n>2) circuit branches in each of which a power transistor is connected in series with a respective winding or phase of the motor, between the terminals of a DC voltage source, in parallel with the other n−1 circuit branches, synchronisation means for providing n square wave electrical control signals phase displaced from one another by 360/n electrical degrees with a frequency which is proportional to the speed of rotation of the rotor of the motor, and having respective alternate enablement and disablement portions, and linear feedback pilot circuit means coupled to the said synchronisation means and to the windings or phases of the motor, and operable cyclically to provide to each of the said power transistors a respective pilot signal variable as a function of the said reference signal and the voltage on the corresponding phase of the motor.

In control circuits for brushless motors of the above indicated type the variable pilot signals applied to the power transistors are such that the said transistors, which are preferably of the MOSFET type, are operated in the substantially linear part of their output characteristic.

The object of the present invention is to provide a control circuit of the above-indicated type which will allow a better operating linearity to be ensured without substantial limitations of the slew rate (continuous linear piloting) and which moreover will not be sensitive to variations in the threshold value of the power transistors used.

This and other objects are achieved according to the invention by means of a control circuit of the type specified above the principal characteristic of which lies in the fact that the said pilot circuit means comprise a set of n control circuits each of which comprises a differential input amplifier with a first input for receiving the said variable reference signal and a second input for connection to an associated phase of the motor;

a transconductance amplifier connected to the output of the said differential amplifier, a capacitor coupled between the output of the said transconductants amplifier and earth, an output buffer amplifier stage the input of which is coupled to the said capacitor and the output of which is connected to the control electrode of the corresponding power transistor, and switching circuit means having a control input coupled to a corresponding output of the synchronisation means and operable to assume a first condition in which the said capacitor is coupled to the transconductance amplifier and to the output amplifier stage to obtain piloting of the associated power transistor when the corresponding control signal emitted by the synchronisation means comprises an enabling portion, and a second condition in which the said capacitor is uncoupled from the transconductance amplifier and from the output amplifier, when the corresponding control signal emitted by the synchronisation means comprises a disabling portion, such that during a disabling portion of the control signal the capacitor is maintained charged substantially at the voltage reached at the end of the preceding enabling portion of the said signal.

Figure 2:
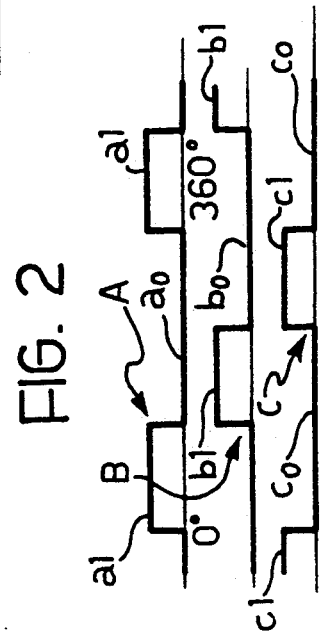
Figure 3:
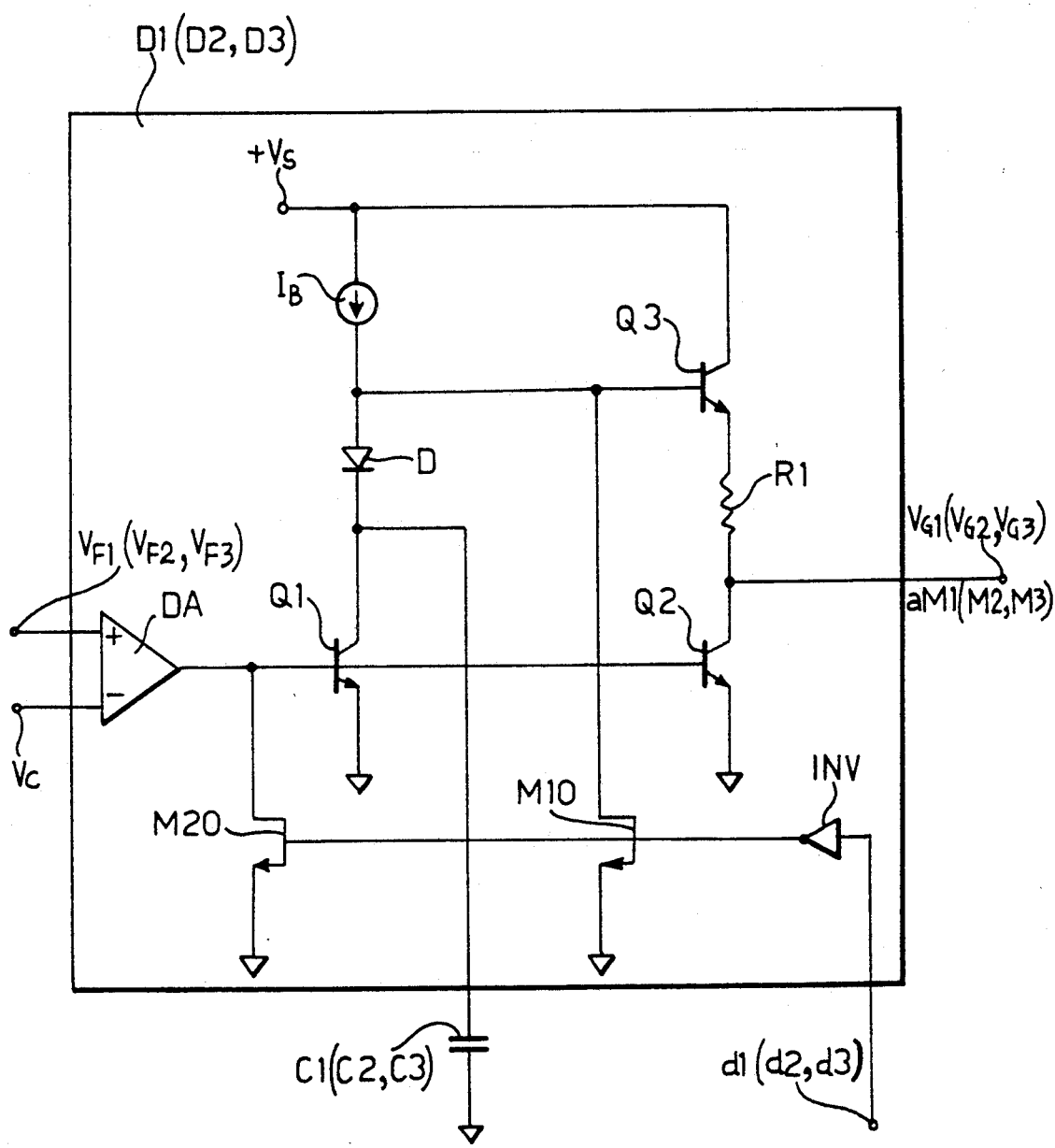
Figure 4:
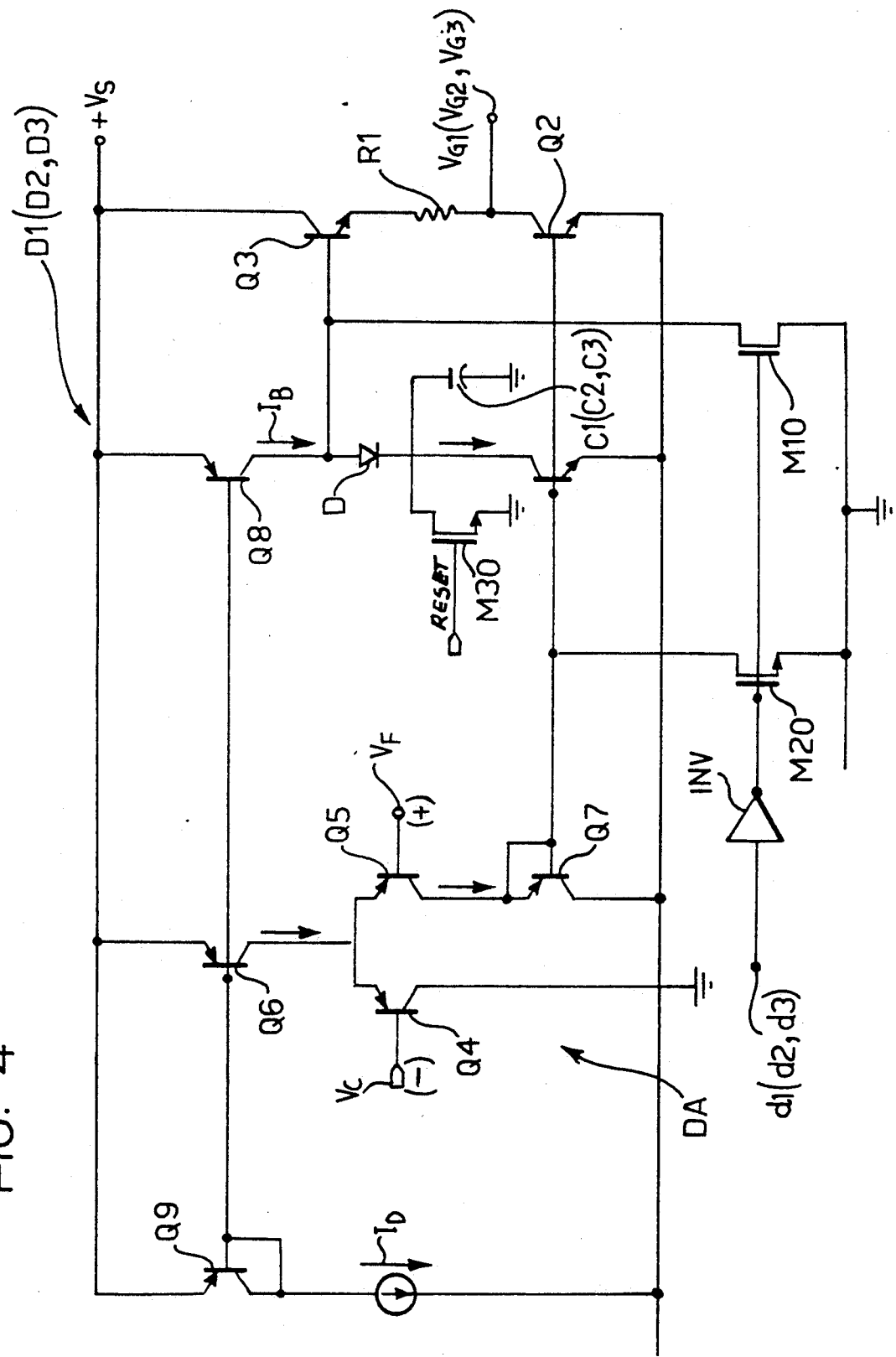
Figure 5:
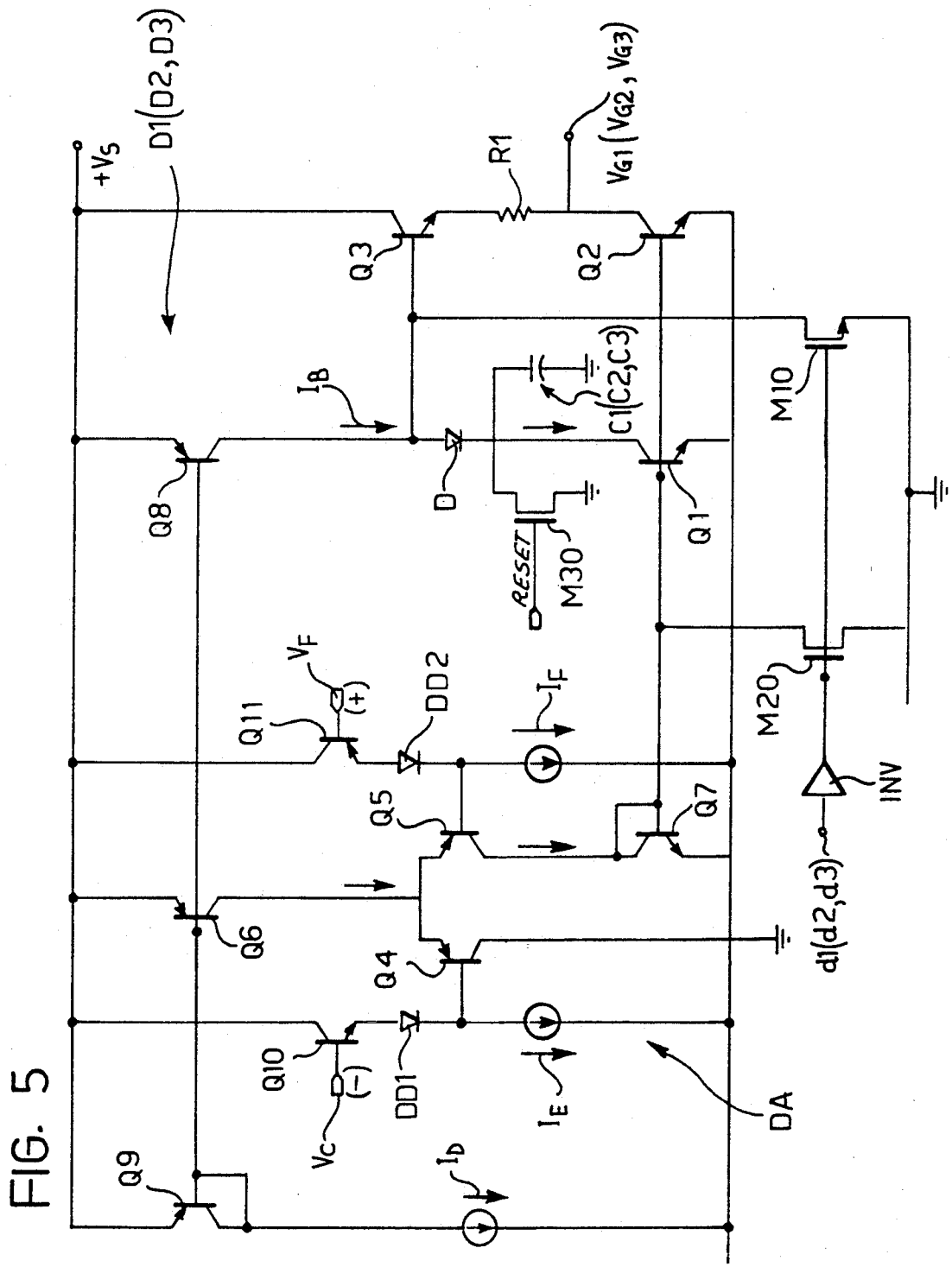

Further characteristics and advantages of the invention will become apparent from the following detailed description, made with reference to the attached drawings, provided purely by way of non-limitative example, in which:

FIG. 1 is a partial block schematic diagram of a pilot circuit for a three-phase half-wave brushless motor, according to the invention, FIG. 2 shows the waveform of three square wave control signals generated in the linear control system of FIG. 1, FIG. 3 is a circuit diagram which shows the internal structure of one of the three control circuits of the linear control circuit of FIG. 1, and FIGS. 4 and 5 are two detailed circuit diagrams relating to two different embodiments of the control circuit shown in FIG. 3.

In FIG. 1 of the attached drawings the structure of a linear feedback control circuit for a three-phase brushless motor is illustrated. The reference numerals W1, W2, W3, and R indicate the windings or phases of the stator and the rotor respectively.

The said windings are electrically disposed in three circuit branches B1, B2 and B3, in series with respective power transistors M1, M2 and M3. These transistors are preferably of the MOSFET type.

The circuit branches B1, B2 and B3 are connected in parallel to one another between the positive terminal of a DC voltage supply source VS and earth.

The transistors M1, M2 and M3 have gates connected to the outputs of respective driver circuits D1, D2 and D3.

Each of the said driver circuits has a first input (+) connected to the junction between the drain of the associated transistor and the corresponding phase of the motor. A second input (−) of each driver circuit is connected to an input terminal I intended to receive a variable reference signal indicative of the desired torque or speed of rotation of the motor. In FIG. 1 the source of this reference signal (which is outside the control circuit of the brushless motor) has been indicated symbolically as a variable current generator IC.

The reference numeral $R_C$ indicates a resistor connected between the input terminal I and the positive pole of the voltage source VS. In operation the current flowing through this resistor is substantially equal to the current $I_C$ and therefore a voltage $V_C$ equal to $R_C I_C$ appears across its terminals. The voltage $V_C$ is also indicative of the desired torque or speed of rotation of the motor.

The reference numeral S indicates a synchronisation circuit which has three inputs s1, s2 and s3 which are connected in order (in a manner not illustrated so as not to overload FIG. 1) to the drains of M1, M2 and M3. By means of these three inputs the synchronisation circuit S senses the voltages ("back emf") $V_{f1}$, $V_{f2}$ and $V_{f3}$ which in operation appear on the windings or phases W1, W2 and W3 of the motor. By detecting the passage through zero of the voltages of phases $V_{f1}$, $V_{f2}$ and $V_{f3}$ in a manner known per se, the synchronisation circuit provides at its three outputs p1, p2 and p3 three square wave control signals phase displaced from one another by 360/3 = 120 electrical degrees, indicated A, B and C in FIG. 2. These signals have a frequency proportional to the speed of rotation of the rotor of the motor, and have respective enablement portions a1, b1 and c1 alternating with disablement portions a0, b0 and c0.

The outputs p1, p2 and p3 of the synchronisation circuit S are connected to corresponding control inputs d1, d2 and d3 of the driver circuits D1, D2 and D3.

In operation, when an enablement portion a1 of the control signal A arrives at the control input d1 of the driver circuit D1 this driver circuit applies to the gate of the transistor M1 a variable pilot signal as a function of the difference between the phase voltage $V_{f1}$ and the voltage $V_C$. The circuit driver D1 in particular pilots the transistor M1 in such as way as to make the phase voltage $V_{f1}$ equal the voltage $V_C$. The transistor M1 is in particular piloted in such a way that it operates in the substantially linear portion of its output characteristic.

Because of the characteristics of the signals A, B and C, when one driver circuit is activated, the other two are disactivated.

The driver circuits D1, D2 and D3 when activated, provide a linear feedback control of the gate voltage of the associated MOSFET power transistors.

Each driver circuit has a respective associated feedback loop compensation capacitor C1, C2 and C3 having one plate connected to earth.

As is seen hereinabove, each time a driver circuit is enabled by the corresponding signal which arrives from the synchronisation circuit S it modulates the gate voltage of the associated MOSFET transistor in such as way as to cause the current in the corresponding phase of the motor to vary so as to tend to make the back electromotive force or phase voltage equal to the control voltage $V_C$ thus achieving speed control.

During each enablement phase of the driver circuit, the slew rate of the driver circuit by which the associated compensation capacitor has to be charged at least to the voltage $V_{gs}$ of the associated MOSFET transistor, can generate non-linearity effects.

This disadvantage is avoided according to the invention by arranging that in the disablement phase of the associated driver circuits these memorise, that is to say maintain, the voltage reached during the preceding enablement phase.

With reference now to FIG. 3 the structure of the driver circuit D1 will be described, it being understood that the other driver circuits have the same structure. This is reflected by the fact that in FIG. 3, as well as the symbols utilised in relation to the driver circuit D1, the symbols utilised in connection with the other driver circuits are also shown in parenthesis.

The driver circuit D1 comprises an input differential amplifier A the inputs (+) and (−) of which represent the input to the entire driver circuit and receive in operation the phase voltage signal $V_{f1}$ and the speed control signal $V_C$ respectively.

The output of the differential amplifier DA is connected to the base of a bipolar transistor Q1 of npn type the emitter of which is connected to earth and the collector of which is connected to the capacitor C1.

A current generator $I_B$ is connected between the positive pole of the voltage source Vs and the anode of diode D the cathode of which is connected to the collector of Q1.

The base of Q1 is connected to the base of a further bipolar transistor Q2 also of npn type, the emitter of which is connected to earth and the collector of which is connected the gate of M1.

A third bipolar transistor Q3, also of npn type, has a base connected to the anode of the diode D, a collector connected to +Vs and an emitter connected to the collector of Q2 through a resistor R1.

The reference M10 indicates a MOSFET transistor the gate of which is connected to the terminal d1 through an inverter INV, the source of which is connected to earth, and the drain of which is connected to the anode of the diode D.

The gate of M10 is also connected to the gate of a further MOSFET transistor M20 the source of which is connected to earth, and the drain of which is connected to the output of the differential amplifier DA.

In operation, when the enablement signal A applied to the terminal d1 is at a "high" level (active portion a1) the MOSFET transistors M10 and M20 are turned off. In this situation the driver circuit D1 behaves substantially as a high gain differentiator/integrator amplifier with a transfer function $V_{g1}/V_c$ equal to $$V_{g1}/V_c = G_{DA} \cdot \left( \frac{g_{m1}}{s \cdot C1} + g_{m2} \cdot R1 \right)$$

in which
$V_{g1}$ is the voltage applied to the gate of the MOSFET power transistor M1,
$V_c$ is the speed control voltage,
$G_{DA}$ is the gain of the differential amplifier DA,
$g_{m1}$ and $g_{m2}$ are the transconductances of Q1 and Q2, and
s is the Laplace variable.

When the signal A applied to the terminal d1 of the driver circuit D1 is at "low" level (disablement phase $a_0$) the MOSFET transistors M10 and M20 are conductive: M20 causes Q1 and Q2 to be switched off, whilst M10 directs current from the generator $I_B$ towards earth and forces the up signal $V_{g1}$ to zero.

In this condition the capacitor C1 is maintained charged at the voltage achieved immediately before the transition of the signal A from high to low level, and the diode D prevents this capacitor from discharging.

FIG. 4 shows the driver circuit of FIG. 3 with a first embodiment of the input differential amplifier DA. In FIG. 4 the parts and elements already described in FIG. 3 have again been given the same reference symbols.

In the FIG. 4 version the differential amplifier DA comprises two pnp transistors Q4, Q5 the bases of which represent the inputs (−) and (+) of the driver circuit. The emitters of Q4 and Q5 are connected to the collector of a pnp transistor Q6 operating as a current generator, the emitter of which is connected to the supply voltage source +Vs.

The collector of Q4 is connected to earth. The collector of Q5 is connected to the collector of an npn transistor Q7 the emitter of which is connected to earth and the base of which is connected to the collector and base of Q1.

The base of Q6 is connected to the bases of two pnp transistors Q8 and Q9. The emitters of these transistors are connected to +Vs. The collector of Q9 is connected to the base of this transistor and has a current generator $I_d$ connected to earth.

In the embodiment shown in FIG. 4 the driver circuit allows achievement of a regulation with $V_C$ variable between $2V_{BE}$ and $V_S$.

Finally M30 in FIG. 4 indicates a MOSFET transistor the drain of which is connected to that plate of C1 which is not earthed, the source of which is connected to earth, and the gate of which is intended to receive a possible reset signal to cause discharge of C1.

In FIG. 5 there is shown a driver circuit in which the input differential amplifier DA has a more complex structure to allow regulation at very low speed, that is to say very small values of $V_C$ ($V_c$ lying between 0 and $V_s 2.V_{BE}$). In FIG. 5 the elements and components already described with reference to FIG. 4 have again been given the same alphanumeric symbols.

In the embodiment of FIG. 5 the bases of Q4 and Q5 are connected to the emitters of two npn bipolar transistors Q10, Q11 via two diodes DD1 and DD2. The bases of Q10 and Q11 serve as input terminals for the differential amplifier.

Between the bases of Q4 and Q5 and earth are interposed two further current generators $I_E$ and $I_F$.

Q10 and DD1, as well Q11 and DD2 serve as driver input voltage level tabulators in such as way as to allow a linear operation of the amplifier even for very low values of the voltage $V_C$.

- Naturally, the principle of the invention remaining the same, the embodiments and details of construction can be widely varied with respect to what has been described and illustrated purely by way of non-limitative example, without by this departing from the ambit of the present invention.

Thus, for example, the enablement signals A, B and C could be achieved with the use of position sensors, for example Hall effect sensors, in a manner known per se, rather than with the previously described arrangement that is based on the observation of the back electromotive forces developed in the phases of the motor.

Moreover, although in the preceding description reference has been made to a three-phase motor, it is obvious that the invention can equally conveniently find application for brushless motors having other than three phases.

We claim:

1. A linear feedback control circuit for a half-wave polyphase brushless motor, comprising an input terminal for receiving a variable reference signal indicative of a desired speed of rotation of the motor, a set of n (n>2) circuit branches in each of which a power transistor is connected in series to a respective winding or phase of the motor, between the terminals of a DC voltage source and in parallel with the other n−1 circuit branches;

synchronisation means operable to provide n square wave electrical control signals out of phase with one another by 360/n electrical degrees, with a frequency which is proportional to the speed of rotation of the rotor of the motor, and having respective enablement portions alternating with disablement portions, and linear feedback pilot circuit means coupled to said synchronisation means and to the windings or phases of the motor and operable to provide cyclically at its output, to each of said power transistors, a respective pilot signal variable as a function of said variable reference signal and the voltage on the corresponding phases of the motor;

said pilot circuit means comprising a set of control circuits each of which comprises a differential input amplifier with a first input to receive the said variable reference signal and a second input to be connected to an associated phase of the motor;

a transconductance amplifier connected to the output of said differential amplifier, a capacitor coupled between the output of said transconductance amplifier and ground, an output buffer amplifier stage the input of which is coupled to said capacitor and the output of which is connected to the control electrode of the corresponding power transistor, and switching circuit means having a control input coupled to a corresponding output of the synchronisation means and operable to assume a first condition in which it allows coupling of the capacitor to the transconductance amplifier and to the output buffer amplifier stage, when an enablement portion of the corresponding control signal is emitted by the synchronisation means, and a second condition in which the capacitor is uncoupled from the transconductance amplifier and the output buffer amplifier stage, when a disablement portion of the corresponding control signal is emitted by the synchronisation means, in such a way that during a disablement portion of the control signal the capacitor is maintained charged substantially at the voltage reached at the end of the preceding enablement portion of the signal.

* * * * *